INVENTOR.
Walter W Robertson
BY Rudolph Hammar
Attorney

Oct. 18, 1966 W. W. ROBERTSON 3,279,381
INTENSIFIER
Filed March 12, 1965 2 Sheets-Sheet 2

INVENTOR.
Walter W Robertson
BY Ralph Hammar
attorney

United States Patent Office 3,279,381
Patented Oct. 18, 1966

3,279,381
INTENSIFIER
Walter W. Robertson, Fairview, Pa., assignor to Autoclave Engineers, Inc., Erie, Pa., a corporation of Pennsylvania
Filed Mar. 12, 1965, Ser. No. 439,230
5 Claims. (Cl. 103—48)

This invention is a hydraulic or pneumatic pressure intensifier in which the large and small pistons are in telescoping relation so as to obtain a compact structure and in which an annular pressure surface on the large piston is used for its return stroke.

Figure 1:
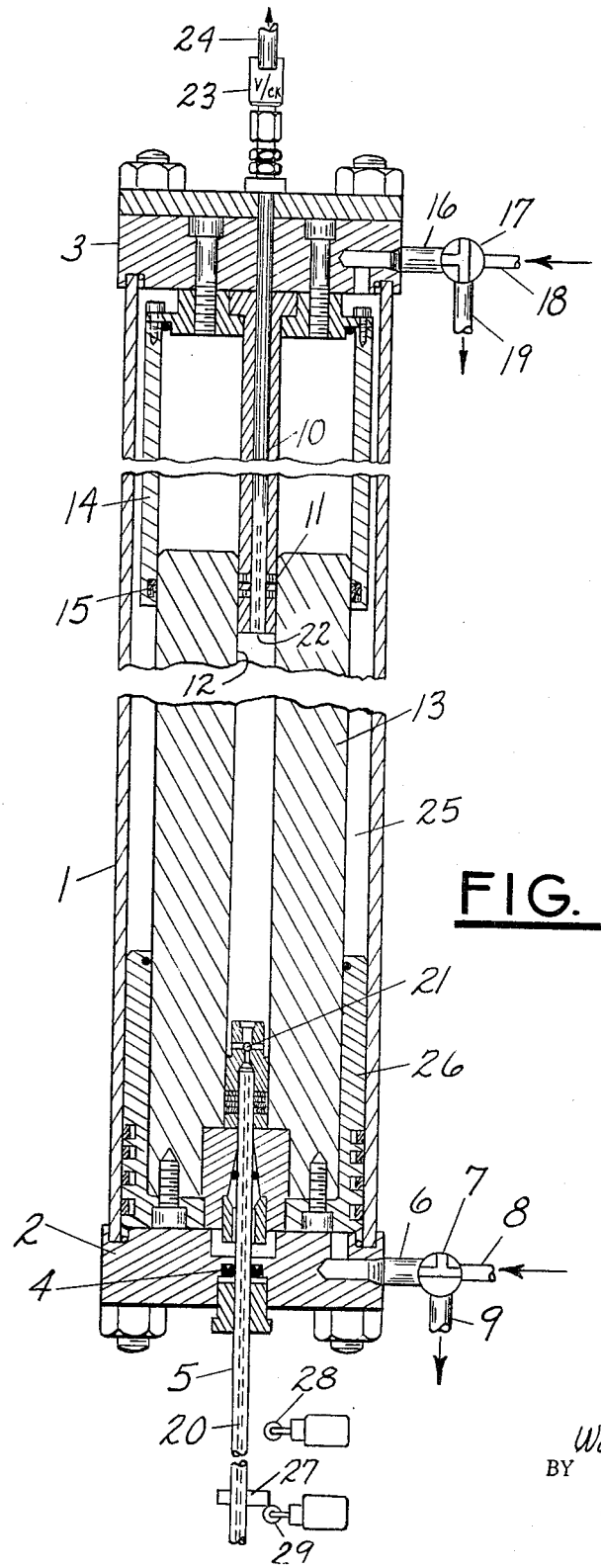
Figure 2:
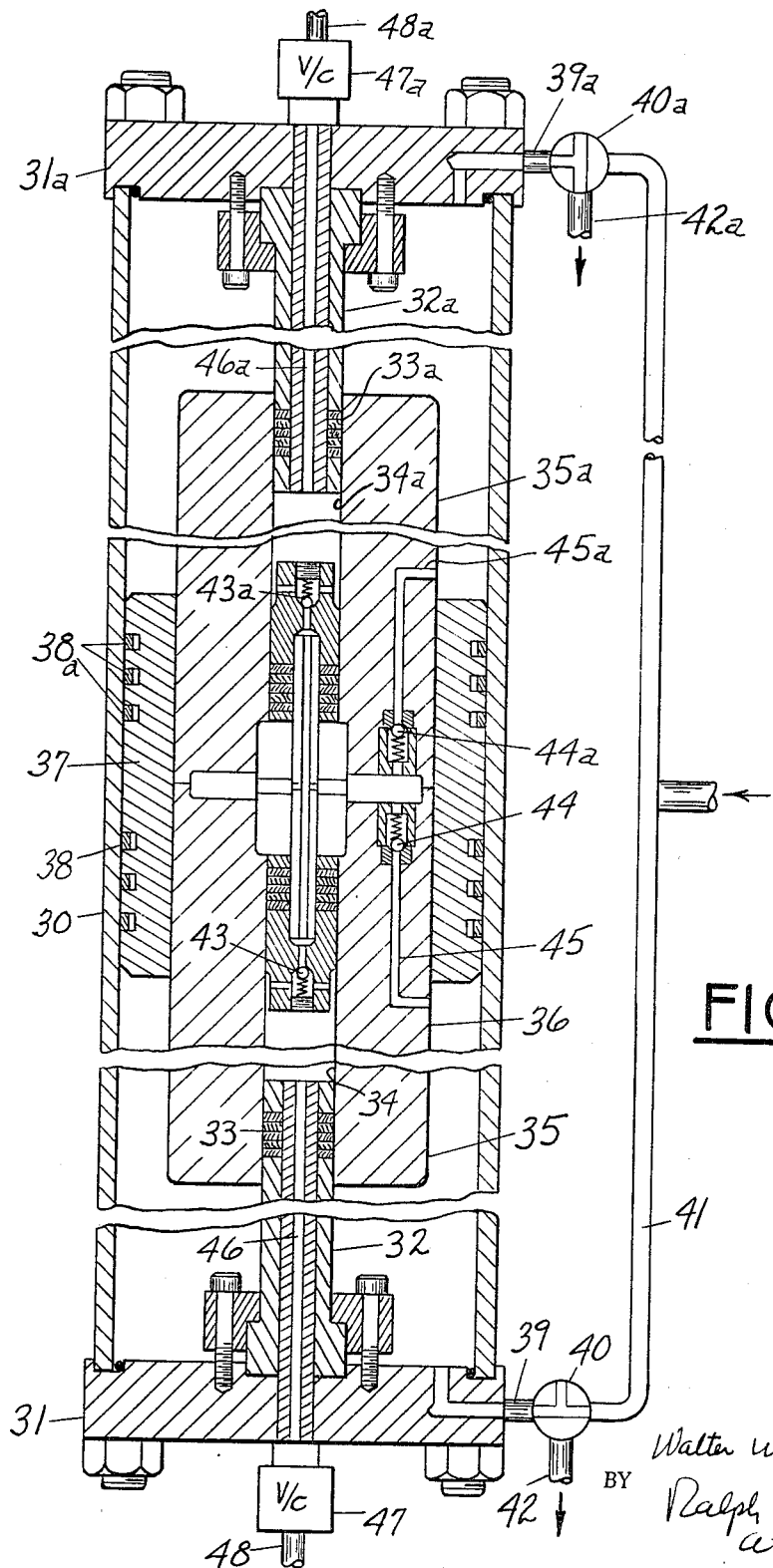

In the drawing, FIG. 1 is a longitudinal section through a single acting intensifier, and FIG. 2 is a longitudinal section through a double acting intensifier.

The intensifier has a cylinder 1 closed by cylinder heads 2, 3 respectively at the input and output ends. The cylinder head the cylinder head 4 for a piston rod 5. At one edge of the cylinder head 2 is an inlet fitting 6 connected by a three way valve 7 either to a fluid pressure line 8 or to a waste line 9. The cylinder head 3 has at its center a stationary small diameter piston 10 carrying at its free end packing 11 slidably received in the bore 12 in the body of a large diameter movable piston 13. Also fixed to the cylinder head 3 is an annular sleeve 14 carrying at its free end packing 15 surrounding the body of the piston 13. The space within the sleeve 14 between the piston 13 and cylinder head 3 is suitably vented to the atmosphere. At one side of the cylinder head 3 is a fitting 16 connected by a three way valve 17 either to a pressure line 18 or a waste line 19. The pressure lines 8 and 18 may be connected to a common source of fluid under pressure and the waste lines 9 and 19 may be connected to a common drain.

The incoming low pressure fluid enters the intensifier through the bore 20 of the piston rod 5 and ball check valve 21 within the bore 12 of the main piston 13. The output of high pressure fluid flows through the bore 22 of the stationary small diameter piston 10 and check valve 23 to a high pressure output line 24.

The intensifier is shown at the beginning of a pressure stroke. In this position, the large diameter piston 13 is in its lowermost position, the three way valve 7 is connected to pressure line 8, the three way valve 17 is connected to waste line 19. As fluid from the pressure line 8 flows into the lower end of the cylinder, it acts upon the head of the large diameter piston and forces the piston upward with a force proportional to the area of the head of the piston. This force acts on the fluid within the bore 12 and forces fluid out through the bore 22 in the stationary piston 10. Since the area of the head of the large piston 13 is greater than the area of the stationary small piston 10, the pressure is multiplied or intensified in proportion to the ratio of the large to small piston areas. As the large piston 13 moves upward, the fluid within the annular space 25 between the cylinder 1 and the large piston 13 is forced out through fitting 16 into waste line 19. The annular space 25 is conveniently provided by the piston ring retainer 26 fastened to the lower end of the piston 13.

Upon reaching the uppermost position, a cam 27 on the piston rod 20 strikes control 28 which reverses the valves 7 and 17 so the fitting 6 is now connected to waste line 9 and the fitting 16 is connected to pressure line 18. The fluid supplied through line 18 acts on the upper end of the ring retainer 26 and forces the main piston 13 downward. The retainer 26 is in effect an annular piston having the function of activating the return stroke of the main piston. During the return stroke of the piston, the ball check valve 21 lifts off its seat so the bore 12 is filled with low pressure fluid and check valve 23 prevents back flow from the high pressure line 24.

Upon reaching the lowermost position, cam 27 strikes control 29 which returns the valves 7 and 17 to the position illustrated, in readiness for the start of the pressure stroke.

The intensifier is compact, an important advantage in high pressure equipment. The output pressure is developed within the bore 12 of the main piston 13 which inherently is of massive construction. The main piston 13 acts as a barricade in the event of failure of the high pressure piston 10, producing inherent safety. The high pressure is delivered through the bore 22 of the small diameter piston 20 which has high strength by reason of its small diameter. The length of the intensifier is reduced by telescoping the small diameter piston within the bore 12 of the main piston 13. The annular sleeve 14 reduces the quantity of operating fluid required for the return stroke of the main piston. The operating fluid supplied by lines 8, 18 acts as a coolant for the high pressure cylinder.

The double acting intensifier of FIG. 2 has a cylinder 30 closed at its ends by cylinder heads 31 and 31a. The cylinder head 31 has at its center a stationary small diameter piston 32 carrying at its free end packing 33 slidably received in the bore 34 in end 35 of a large diameter piston 36. The piston 36 is symmetrical about its center, the opposite end 35a having a bore 34a slidably receiving packing 33a in a small diameter piston 32a fixed to the cylinder head 31a. The two parts 35 and 35a of the main piston are secured together at their center by a sleeve 37 carrying piston rings 38, 38a.

The head 31 has a fitting 39 connected by a three way valve 40 to either a fluid pressure line 41 or a waste line 42. The head 31a has a fitting 39a connected by a three way valve 40a either to the fluid pressure line 41a or to a waste line 42a.

In the double acting intensifier, the low pressure fluid whose pressure is to be raised is supplied from pressure line 41. The fluid enters the bore 34 through ball check valves 43 and 44 connected by way 45 to the space between the end 35 of the main piston and the cylinder 30. The fluid enters the bore 34a through ball check valves 43a and 44a connected by way 45a to the space between the end 35a of the main piston and the cylinder 30. The low pressure fluid from line 41 surrounds the high pressure pistons 32 and 32a and cools the high pressure piston. The high pressure pistons are surrounded by the main pistons 35, 35a and by the cylinder 30, both providing barricades in case of rupture.

The high pressure output from piston 32 flows through bore 46 and check valve 47 to high pressure line 48. Similarly, the high pressure output from piston 32a flows through bore 46a and check valve 47a to high pressure line 48a. Usually the high pressure lines 48 and 48a are connected to a common output line.

The intensifier is shown with fluid supplied from the line 41 to the space between the piston head 31 and the end 35 of the main piston, thereby exerting a force tending to move the main piston 36 upward in the cylinder 30. The space between the end 35a of the main piston and the cylinder 30 is connected by valve 40a by waste line 42a. During the upstroke, ball check valve 43a is held against its seat by the pressure in output line 47a. Ball check valve 44a is held against its seat by the pressure from line 41 and ball check valves 44 and 43 are lifted off their seats by pressure from the line 41, thus maintaining the bore 34 filled as the main piston 36 moves upward. During the upstroke, fluid pressure from the line 41 acts upon the end 35 of the main piston and the adjacent end of the sleeve 37 providing a large upward force which acts on the fluid within the bore 34a and forces fluid out through the bore 46a in the piston 32a into the high pressure line 48a. By reason of the large difference in area, the pressure is multiplied or intensified. At the same time during the upstroke, the fluid surrounding the end 35a of the main piston is forced out through fitting 39a to the waste line 42a.

Upon reaching the upper limit of its stroke, by suitable control means (not shown) the valves 40 and 40a are reversed connecting the pressure line 41 through fitting 39a to the space surrounding the end 35a of the main piston and connecting the space surrounding the end 35 of the main piston through fitting 39 to waste line 42. During the reverse stroke, fluid pressure forces the main piston downward, the check valves 43 and 44 being held closed and the check valves 43a and 44a being open so that the incoming fluid is supplied to the bore 34a to keep it full. During the downward stroke, there is a similar multiplication or intensification of the pressure due to the ratio of areas between the large and small diameter pistons.

What is claimed as new is:

1. A hydraulic or pneumatic pressure intensifier comprising a cylinder, a main piston having a head slidable in the cylinder and presented toward one end of the cylinder and a body of lesser diameter than the head presented toward the other end of the cylinder and forming an annular space between it and the cylinder, said body having a counter bore presented toward said other end of the cylinder, a stationary small diameter piston fixed to said other end of the cylinder and telescoped into said bore, said stationary piston having a bore leading through said other end of the cylinder, an annular sleeve fixed to said other end of the cylinder and telescoped over said body, a piston rod fixed to the head of said main piston and extending through said one end of the cylinder and having a bore adapted to be connected to the fluid whose pressure is to be raised and leading to said bore in the body of the main piston, valve means for preventing back flow through said bores in the piston rod and in the small diameter piston, means for supplying operating fluid under pressure to the space between said one end of the cylinder and the piston head for the pressure stroke of the main piston, and means for supplying operating fluid under pressure to the annular space between the body of the main piston and the cylinder for the return stroke of the main piston.

2. A hydraulic or pneumatic pressure intensifier comprising a cylinder, a main piston having a head slidable in the cylinder and presented toward one end of the cylinder and a body presented toward the other end of the cylinder, said body having a counter bore presented toward said other end of the cylinder, a stationary small diameter piston fixed to said other end of the cylinder and telescoped into said bore, said stationary piston having a bore leading through said other end of the cylinder, a piston rod fixed to the head of said main piston and extending through said one end of the cylinder and having a bore adapted to be connected to the fluid whose pressure is to be raised and leading to said bore in the body of the main piston, valve means for preventing back flow through said bores in the piston rod and in the small diameter piston, and means for supplying operating fluid under pressure to the space between said one end of the cylinder and the piston head for the pressure stroke of the main piston.

3. A hydraulic or pneumatic pressure intensifier comprising a main piston having a head and a body of lesser diameter than the head extending axially from one side of the head, said body having a counter bore extending into the body toward the head, a stationary small diameter piston telescoped into said bore, said stationary piston having a bore leading through it, cylinder means slidably receiving the head and body of the main piston and providing an annular space between the body and said one side of the head, a piston rod fixed to the head of said main piston and extending from the other side of the head and having a bore adapted to be connected to the fluid whose pressure is to be raised and leading to said bore in the body of the main piston, valve means for preventing back flow through said bores in the piston rod and in the small diameter piston, means for supplying operating fluid under pressure to the other side of the head for the pressure stroke of the main piston, and means for supplying operating fluid under pressure to said annular space for the return stroke of the main piston.

4. A hydraulic or pneumatic pressure intensifier comprising a cylinder, a main piston having a body of lesser diameter than said cylinder providing an annular space between it and the cylinder, a sleeve slidable in the cylinder and telescoped over and fixed to the body and closing said annular space, said body having a bore extending into one end thereof, a stationary small diameter piston extending into said bore, said stationary piston having a bore leading through it adapted to be connected to a high pressure line, means for supplying fluid whose pressure is to be raised to the space between the stationary piston and the bore in said body, and means for supplying operating fluid under pressure to the other end of said body and to the associated sleeve for the pressure stroke of the main piston.

5. A hydraulic or pneumatic pressure intensifier comprising a cylinder, a main piston with a central section and ends on opposite sides of the central section, said body being of lesser diameter than said cylinder and providing an annular space between it and the cylinder, a sleeve slidable in the cylinder and fixed to the central section and closing said annular space, said body having a bore extending into each end, a stationary small diameter piston extending into each bore, each stationary piston having a bore leading through it adapted to be connected to a high pressure line, means for supplying fluid whose pressure is to be raised to the space between each stationary piston and the associated bore in said body, and means for supplying operating fluid under pressure to the ends of the body and the associated sleeve.

References Cited by the Examiner
UNITED STATES PATENTS

| | | | |
|---|---|---|---|
| 2,652,780 | 9/1953 | Adams | 103—158 X |
| 2,765,625 | 10/1956 | Hart | 103—50 X |

ROBERT M. WALKER, *Primary Examiner.*